Dec. 13, 1960    D. R. SAND    2,964,135
BRAKE MECHANISM

Filed Aug. 19, 1957    2 Sheets-Sheet 1

INVENTOR.
Darrel R. Sand
BY
W. C. Middleton
ATTORNEY.

Dec. 13, 1960 D. R. SAND 2,964,135
BRAKE MECHANISM
Filed Aug. 19, 1957 2 Sheets-Sheet 2

INVENTOR.
Darrel R. Sand
BY W. C. Middleton
ATTORNEY.

United States Patent Office 2,964,135
Patented Dec. 13, 1960

2,964,135

BRAKE MECHANISM

Darrel R. Sand, Plymouth, Mich., assignor to General Motors Corporation, Detroit, Mich., a corporation of Delaware Filed Aug. 19, 1957, Ser. No. 678,770

6 Claims. (Cl. 188—69)

This invention relates generally to brake mechanisms and particularly to improvements in parking brake mechanisms for motor vehicles.

Usually, parking brake mechanisms for motor vehicles are of the positive type inasmuch as simplicity and cost are primary considerations. For operating the parking brake with minimum operator effort adequate leverage is commonly provided by rather complex linkages composed of multiple links and levers, and as a result, variations in each link and lever, permitted by manufacturing tolerances, tend to accumulate. To control this accumulation, the dimensional tolerances must be restricted, therefore, increasing the cost, or else extremes, such as those occurring when a brake will not disengage with normal effort and when a brake disengages without any effort, would happen too often, especially with volume production.

Accordingly, the invention contemplates a brake mechanism that is both yieldably engaged and positively disengaged with a minimum operator effort, that is simplified structurally with a minimum of links and levers lessening variations from accumulation of manufacturing tolerances, and that utilizes a unique rolling arrangement to lessen frictional resistances.

Specifically, the invention proposes a brake mechanism of the foregoing character especially suited for operation by a cable by which movements are transferred to a locking pawl through a roller element to effect engagement and disengagement thereof with a locking gear.

In a preferred embodiment of the invention, a locking pawl is pivotally mounted for movement to and from an engaged position relative to a locking gear to prevent movement of a rotatable member secured to the locking gear. Journaled on the pawl is a roller element that engages arcuate recesses, corresponding to the engaged and disengaged positions of the pawl, formed along an adjacent cam surface on a rotatable actuator lever. The actuator lever is appropriately drive connected to a transfer lever through a yieldable connection for causing pawl engaging movement and a positive connection for effecting pawl disengaging movement. The yieldable connection provides for the situation when the teeth on the pawl and the locking gear are not aligned properly to permit an interengagement. Interconnecting the transfer lever and a manually operated selector member is a cable which is pushed for engagement and pulled for disengagement of the pawl. By employing rolling action, a cable can be utilized eliminating the necessity for multiple links and levers.

The foregoing and other objects and advantages of the invention will be apparent from the following description and from the accompanying drawings, in which.

Figure 1:
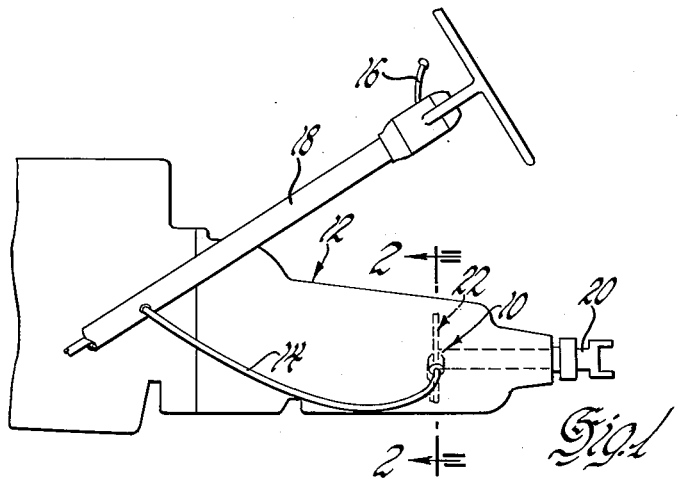
Figure 1 is a view of a transmission incorporating a brake mechanism embodying the principles of the invention.

Referring to the drawings and particularly Figure 1, a brake mechanism, designated generally at 10, constructed according to the invention, is shown installed in a vehicle transmission 12. The brake mechanism 10 is operated through a cable 14 by a conventional transmission selector lever 16 rotatably mounted on the steering column 18. When the selector lever 16 is moved to the transmission brake setting, e.g., "park," the brake mechanism is effective to prevent rotation of a transmission output shaft 20 and, therefore, maintains the vehicle stationary.

Figure 2:
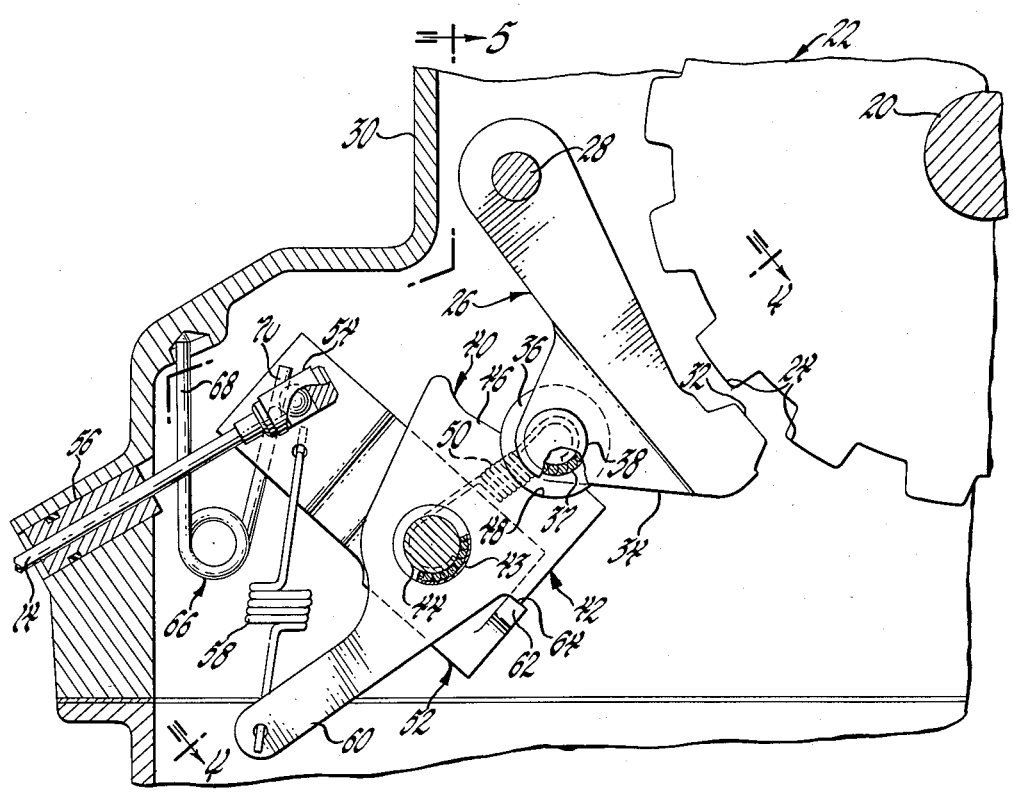
Figure 2 is a view of the brake mechanism, illustrated in the disengaged position, along line 2—2 of Figure 1.
Figure 3:
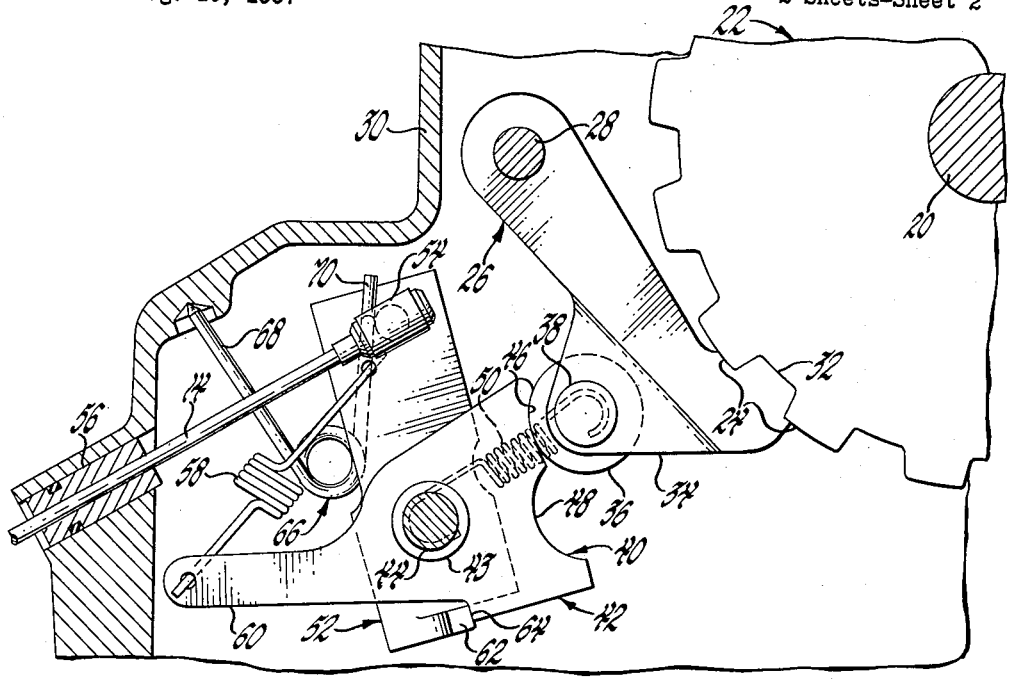
Figure 3 is a view similar to that of Figure 2 demonstrating the brake mechanism in the engaged position.
Figures 4, 5:
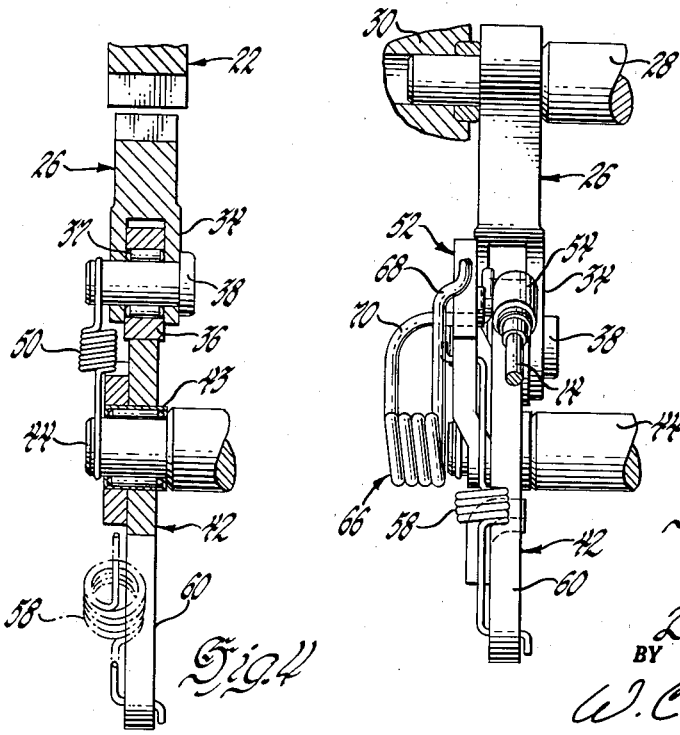
Figure 4 is a sectional view of the mechanism along line 4—4 of Figure 2.
Figure 5 is a view of the mechanism looking in the direction of arrows 5—5 in Figure 2.

As best shown in Figures 2 and 3, a locking gear 22 having a series of peripherally spaced teeth 24 disposed thereon is drive connected to the transmission output shaft 20. Next to the locking gear 22, a locking pawl 26 is pivotally mounted on a stub shaft 28 attached to the casing 30 for the transmission. A tooth 32 on the pawl 26 is arranged upon pivotal movement of the pawl to move to the engaged or "park" position and intermesh with the teeth 24 on the gear 22, hence, preventing rotation, in either direction, of the gear 22 and the output shaft 20. The backside of the pawl 26, i.e., the side opposite the tooth 32, is bifurcated at 34 (see Figure 4) to define an enclosure for a roller element 36 which is journaled by a suitable bearing, such as a needle bearing 37, on a shoulder pin 38. The roller element 36 is in rolling engagement with a cam surface 40 afforded along an edge of an actuator lever 42 which is rotatably supported by a bearing 43 on a cross shaft 44 extending from and attached to the casing 30. The cam surface 40 is furnished with spaced arcuate recesses 46 and 48 corresponding to the pawl engaged and disengaged positions, respectively, depicted by Figures 2 and 3. As the actuator lever 42 is rotated from the Figure 2 position, the roller element 36 will travel out of the recess 48 and into the recess 46 at which time the pawl 26 will be moved from the Figure 2 disengaged position to the Figure 3 engaged position.

In order to maintain the roller element 36 in constant engagement with the cam surface 40, a coil spring 50 is mounted with one arm around an end of the shoulder pin 38 and the opposite end around the end of the cross shaft 44. By locating the spring 50 in this manner, the spring ends function as retainers limiting axial movement of the related components along the pin 38 and the shaft 44. Furthermore, the spring 50 acts as an anti-rattle device between the engaging surfaces.

Adjacent the actuator lever 42 and rotatable also on the bearing 43 is a transfer lever 52 which includes thereon a socket connector 54, in turn, affixed to an end of the cable 14. Cable 14 extends externally of the transmission casing 30 through a guide bearing 56 positioned within an opening in the casing. A coil extension spring 58 is connected at one end to the transfer lever 52 and at the opposite end to an arm 60 on the actuator lever 42. By the spring a yieldable drive connection between the transfer lever 52 and the actuator lever 42 is provided when the transfer lever is rotated clockwise, as viewed in Figures 2 and 3. The purpose of the yieldable connection is to allow for the event that the pawl tooth 32 and the gear teeth 24 are misaligned and an engagement therebetween cannot be completed. The transfer lever 52 can still be moved to the pawl engaged position while the actuator lever 42 remains in the pawl disengaged position and the spring 58 will be loaded due to the extension thereof. Subsequently, when the pawl tooth 32 and the locking gear teeth 24 are aligned, the spring 58 will quickly rotate the actuator lever 42 and, accordingly, engage the pawl 26. It should be noted that the length of the actuator lever arm 60 may be varied to acquire the desired leverage for quick and easy engagement of the pawl 26. The transfer lever 52 has at the bottom edge a lanced-out tab 62 which is located opposite an adjacent drive surface 64 along the edge of the actuator lever 42. The coaction of the tab 62 and the drive surface 64 furnishes a positive drive connection for removing the pawl 26 from the engaged position when the transfer lever 52 is rotated counterclockwise, as seen in Figures 2 and 3.

A torsion spring 66 has one end 68 thereon grounded to the casing 30 and the opposite end 70 attached to the upper end of the transfer lever 52. Spring 66 exerts a constant biasing force which urges the transfer lever 52 and, as a result, the pawl 26 from the Figure 3 engaged position to the Figure 2 disengaged position. In addition, if desired, the spring 66, when in the Figure 2 position, can be appropriately preloaded to eliminate rattles occurring in the mechanism and insure that the pawl 26 is maintained out of the engaged position.

To summarize the operation, assume first that the transmission selector lever 16 has been removed from the "park" position setting and that the brake mechanism 10 is in the Figure 2 position representing the unpark or disengaged position of the pawl 26. Movement of the lever 16 to the "park" position will exert through cable 14 and socket connector 54 a push on the transfer lever 52 causing it to rotate clockwise. As a consequence, the spring 58 will rotate the actuator lever 42 in the same sense and cause the roller element 36 to be removed from the arcuate recess 48 assuming that the pawl tooth 32 and the teeth 24 on the locking gear 22 are properly aligned. If these teeth are not aligned then, as mentioned before, the coil spring 58 will be extended until the teeth are aligned. After removal of the roller element 36 from the recess 48, continued rotation of the actuator lever 42 will cause the roller element 36 to engage the recess 46, at which time the engagement of the pawl tooth 32 with the gear teeth 24 will be completed. As best shown by Figure 3, a substantially straight line is established by the centers of the cross shaft 44, roller element 36 and the transmission output shaft 20, therefore, providing a strut to positively resist disengaging movement of the pawl 26 during any attempt to rotate the output shaft 20.

When the selector lever 16 is removed from the "park" position, a pull is exerted by the cable 14 and through the connector 54 is transferred to the lever 52 whereupon the lever 52 will be rotated with the assistance of the torsion spring 66 counterclockwise to the Figure 2 disengaged position. Through the positive connection afforded by the tab 62 and the drive surface 64, the roller element 36 will roll out of the recess 46 and into the recess 48. The distance at which the engagement between the tab 62 and the surface 64 occurs relative to the center of the cross shaft 44, of course, can be varied within the space allotted to obtain a lever ratio which will insure that a minimum pull-out effort is required.

From the foregoing, it can be seen that a cable has been utilized to replace equivalent multiple component linkage and the requisite leverage has been obtained to compensate therefor through unique arrangements. For instance, as determined by each application of the brake mechanism, the arm 60 on the actuator lever 42 may be varied as well as the distance between the center of the cross shaft 44 and the contact point of tab 62 with the drive surface 64. In addition, rolling action of the type producing a minimum frictional resistance is utilized in conjunction with springs to aid operation of the mechanism. To further assist the operator in effecting a disengagement, the tooth side angles of the pawl tooth 32 and the gear teeth 24 may be arranged to disengage under load or, if preferred, selected to maintain the engagement when loaded and the leverage distances suitably varied.

The invention is to be limited only by the following claims.

I claim:

1. In a brake mechanism, the combination of a rotatable member, a locking member connected to the rotatable member, a locking element mounted for pivotal movement to and from an engaged position with the locking member to prevent rotation of the rotatable member, a roller element journaled on the locking element, a rotatably mounted actuator for the locking element including a cam surface thereon in engagement with the roller element, the cam surface having arcuate recesses therein, movement of the actuator causing the roller element to roll along the cam surface from one recess to another and move the locking element to and from the engaged position and a push and pull operated cable connected to the actuator for moving the locking element to and from the engaged position by the coaction of the cam surface and the roller element, the rotatable member, the roller element, and the actuator all having the axes thereof arranged in a substantially straight line when the locking element is in the engaged position so as to resist movement of the locking element to the disengaged position.

2. In a brake mechanism, the combination of a rotatable member, a locking gear connected to the rotatable member, a locking pawl pivotally mounted for movement to and from an engaged position with the locking gear to prevent rotation of the rotatable member, a roller element journaled on the pawl, a rotatably mounted actuator for the pawl including a cam surface thereon in engagement with the roller element, movement of the actuator causing the pawl to be moved to and from the engaged position by the coaction of the cam surface and the roller element, biasing means interposed between the actuator and the pawl for maintaining the roller element in continuous engagement with the cam surface, a cable coacting with the actuator, and manually controlled means for pushing the cable to effect a yieldable engagement of the pawl with the locking gear and for pulling the cable to effect a positive disengagement of the pawl with the locking gear, the rotational axes of the actuator, the roller element, and the rotatable member being arranged when the locking pawl is in the engaged position so as to form a strut for resisting pivotal movement of the locking pawl from the engaged position.

3. In a brake mechanism, the combination of a rotatable member, a locking gear connected to the rotatable member, a locking pawl pivotally mounted for movement to and from an engaged position with the locking gear to prevent rotation of the rotatable member, a roller element journaled on the pawl, a rotatable actuator for the pawl including a cam surface thereon in engagement with the roller element, the cam surface having recesses therein, movement of the actuator causing the roller detent to roll along the cam surface from one recess to another and move the pawl to and from the engaged position, biasing means for maintaining the roller element in engagement with the cam surface, the biasing means being arranged between the actuator and the pawl, a rotatable transfer member including an abutment thereon engageable with the actuator to provide a positive drive connection therebetween in one direction, tension means interposed between the transfer member and the actuator to afford a yieldable drive connection therebetween in another direction, the tension means being arranged relative to the rotational axes of the transfer member and the actuator so as to afford a predetermined lever ratio, a cable connected to the transfer member, manually controlled means for pushing the cable to move the pawl by the yieldable drive connection to the engaged position and for pulling the cable to withdraw the pawl by the positive drive connection from the engaged position.

4. In a brake mechanism, the combination of a rotatable member, a locking gear connected to the rotatable member, a locking pawl pivotally mounted for movement to and from an engaged position with the locking gear to prevent rotation of the rotatable member, a roller element journaled on the pawl, a rotatable actuator for the pawl including a cam surface thereon in engagement with the roller element, the cam surface having arcuate recesses therein, movement of the actuator causing the roller detent to roll along the cam surface from one recess to another and move the pawl to and from the engaged position, biasing means for maintaining the roller element in engagement with the cam surface, the biasing means being arranged between the actuator and the pawl, a transfer member including an abutment thereon engageable with the actuator to provide a positive drive connection therebetween in one direction, means interposed between the transfer member and the actuator to afford a yieldable drive connection therebetween in another direction, a cable connected to the transfer member, a manually controlled means for pushing the cable to move the pawl by the yieldable drive connection to the engaged position and for pulling the cable to withdraw the pawl by the positive drive connection from the engaged position, and biasing means acting on the transfer member for urging the pawl from the engaged position and for pre-loading the cable and the mechanism.

5. In a brake mechanism, the combination of a rotatable member, a locking gear connected to the rotatable member, a locking pawl pivotally mounted for movement to and from an engaged position with the locking gear to prevent rotation of the rotatable member, a roller element journaled on the pawl, a rotatable actuator lever for the pawl including a cam surface arcuate thereon in engagement with the roller element, the cam surface having arcuate recesses therein, movement of the actuator lever causing the roller element to roll along the cam surface from one arcuate recess to another and move the pawl to and from the engaged position, a spring interposed between the actuator lever and the pawl for maintaining the roller element continuously in engagement with the cam surface, a transfer lever rotatably mounted coaxial with the actuator lever and including an abutment thereon engageable with the actuator lever to provide a positive drive connection therebetween in one direction, a tension spring interposed between the transfer lever and the actuator to afford a yieldable drive connection therebetween in another direction, the tension spring being connected to the transfer and actuator levers at selected distances from the rotational axes of each so as to afford a predetermined lever ratio therebetween, a manual control, a cable interconnecting the manual control and the transfer lever, the manual control operating to push the cable and move the pawl by the yieldable drive connection to the engaged position and pull the cable to withdraw the pawl by the positive drive connection from the engaged position.

6. In a parking brake mechanism for a transmission, the combination of a transmission shaft, a locking gear connected to the transmission shaft, a locking pawl pivotally mounted for movement to and from an engaged position with the locking gear to prevent rotation of the transmission shaft, a roller element journaled on the pawl, a rotatable actuator lever for the pawl having arcuate recesses along a surface thereof for engagement with the roller element, movement of the actuator lever causing the roller element to travel along the actuator lever surface in and out of the arcuate recesses to move the pawl to and from the engaged position, a spring interposed between the actuator lever and the pawl for maintaining the roller element continuously in engagement with the actuator lever surface, a transfer lever rotatably mounted coaxial with the actuator lever and including an abutment thereon engageable with the actuator lever to provide a positive drive connection therebetween in one direction, a tension spring interposed between the transfer lever and the actuator lever to afford a yieldable drive connection therebetween in another direction, the tension spring being connected to the transfer and actuator levers at selected distances from the rotational axes of each so as to afford a predetermined lever ratio therebetween, a selector lever, a cable interconnecting the selector lever and the transfer member, the selector lever being movable for pushing the cable to move the pawl by the yieldable drive connection to the engaged position and for pulling the cable for withdrawing the pawl by the positive drive connection from the engaged position, and a pawl disengaging spring acting on the transfer lever for urging the pawl from the engaged position for providing a pre-load on the cable and the mechanism.

References Cited in the file of this patent

UNITED STATES PATENTS

| | | |
|---|---|---|
| 1,977,588 | Matson | Oct. 16, 1934 |
| 2,689,029 | McFarland | Sept. 14, 1954 |
| 2,732,036 | Myers | Jan. 24, 1956 |
| 2,770,326 | Wayman | Nov. 13, 1956 |
| 2,792,716 | Christenson | May 21, 1957 |
| 2,865,227 | Kelley et al. | Dec. 23, 1958 |